Figure 3:
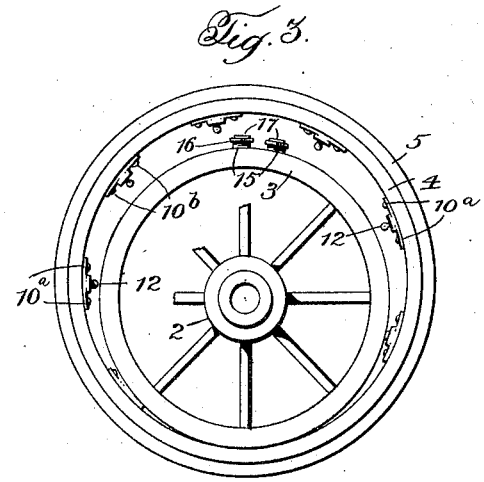

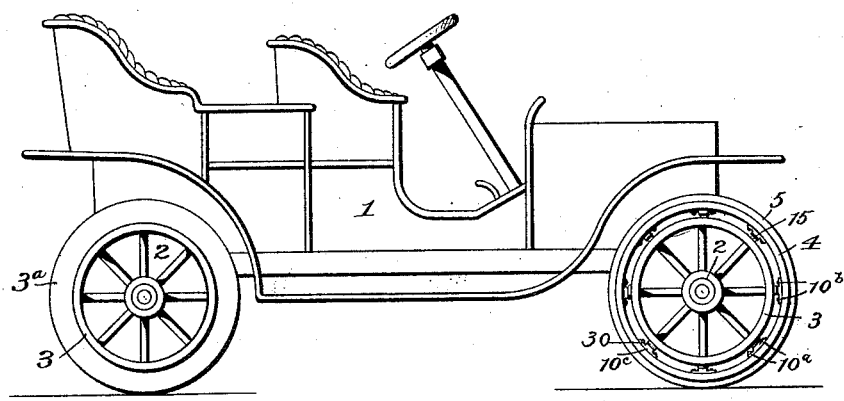
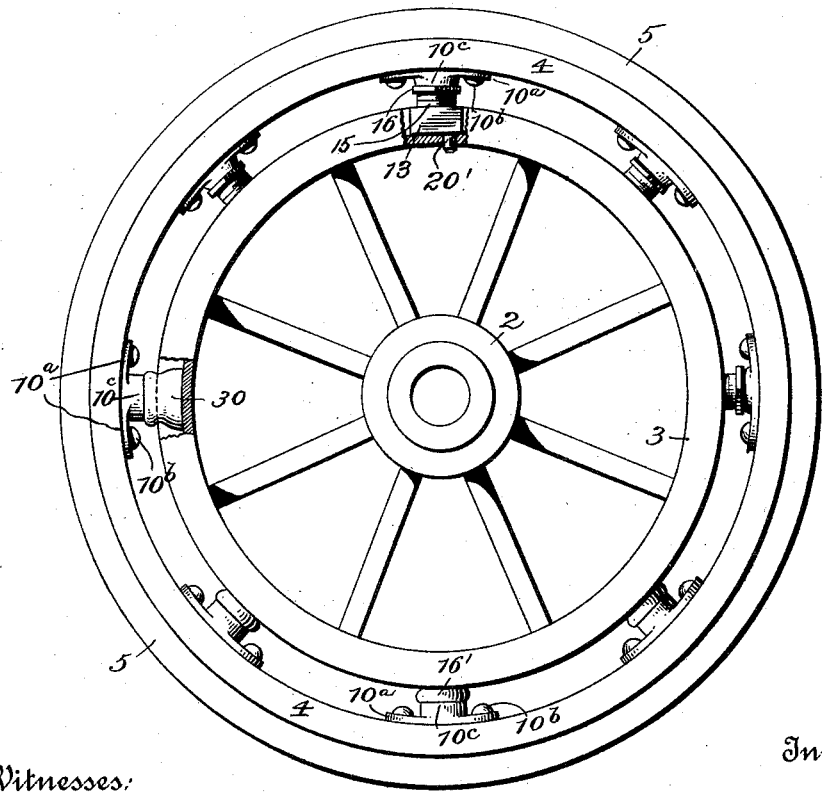

E. T. BURROWES.
EMERGENCY ATTACHMENT FOR VEHICLE WHEELS.
APPLICATION FILED JUNE 23, 1909.

1,019,301.

Patented Mar. 5, 1912.

3 SHEETS—SHEET 2.

Witnesses:
Jas E Hutchinson
Calvin V. Milans

Inventor:
Edward T. Burrowes,
By T. W. M. Milans Attorneys

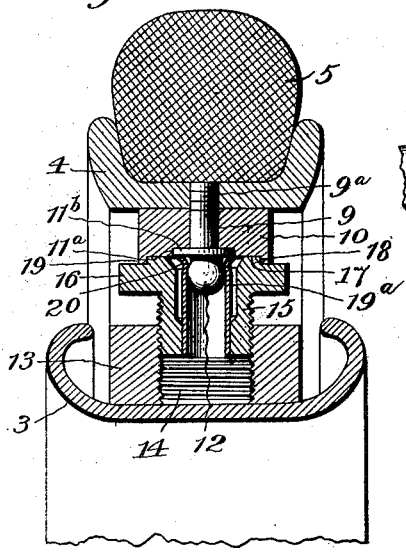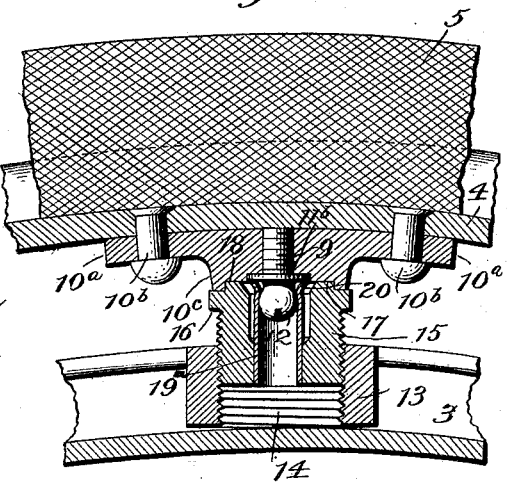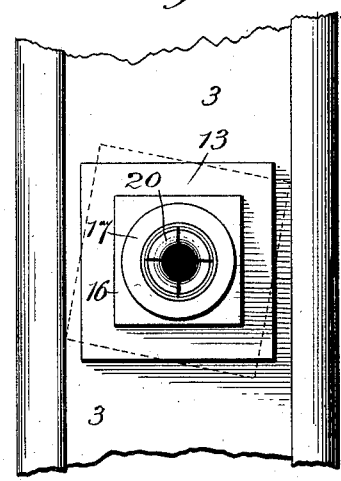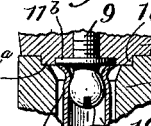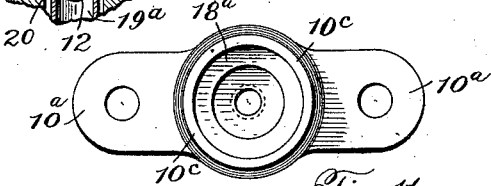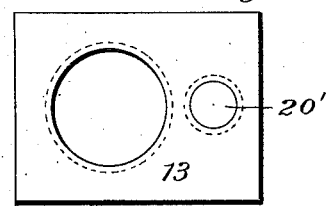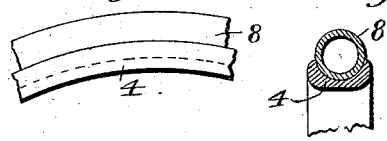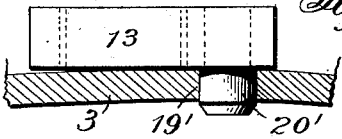

UNITED STATES PATENT OFFICE.

EDWARD T. BURROWES, OF PORTLAND, MAINE.

EMERGENCY ATTACHMENT FOR VEHICLE-WHEELS.

1,019,301.   Specification of Letters Patent.   Patented Mar. 5, 1912.

Application filed June 23, 1909. Serial No. 503,854.

*To all whom it may concern:*

Be it known that I, EDWARD T. BURROWES, a citizen of the United States, residing at Portland, in the county of Cumberland and State of Maine, have invented certain new and useful Improvements in Emergency Attachments for Vehicle-Wheels, of which the following is a specification, reference being had therein to the accompanying drawing.

The present invention relates to an emergency attachment adapted to be applied to the main wheels of a motor vehicle or the like usually employing a collapsible tire the attachment being adapted to take the place of said tire as occasion demands.

The many objectionable features incident to the repair or replacing of a tire of the collapsible type while the vehicle is on the road has led to the suggestion of emergency appliances adapted to be applied to the main wheel, the tire of which has become deflated or damaged. These emergency appliances have more usually consisted of an auxiliary wheel, or a skeleton wheel including a rim and tread, the same being adapted to be positioned to one side of the main wheel and to be secured to the latter by suitable attaching devices or clamps engaging the spokes or rim of the main wheel. In such devices the lateral strain is considerable and it is difficult to obtain the necessary rigidity or balance for the emergency attachment.

The present invention is designed to overcome these and other difficulties and resides in the employment of an emergency attachment of a type including a rim and tread, and novel means for mounting said attachment directly on the rim of the damaged wheel, the tire having been previously removed from the latter, and the substituted rim being adapted to surround the rim for the removed tire, thereby occupying the previously occupied position of the punctured tire, and doing away with all lateral projection incident to connection. Further the improved attachment is adapted to be applied to rims of usual construction and this without injury to the rim or the side flanges thereof, and since the same overlies the rim of the main wheel, it will be equally balanced and have the same rigidity and support as the replaced tire.

More particularly, the invention includes a spare or emergency rim and tread and novel means for supporting the same on and securing the same directly to the base of the rim of the punctured tire.

In the accompanying drawings which form a part hereof, certain embodiments of the invention which have proven satisfactory are disclosed for the purpose of illustration. However, I desire it understood that many changes may be made in carrying out the principles of operation without deviating from the spirit of the invention.

Figure 5:
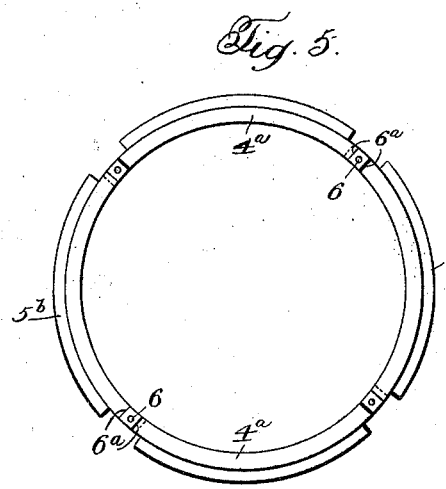
Figure 6:
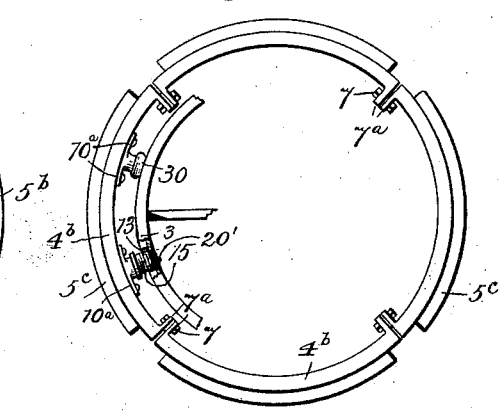
Figure 15:
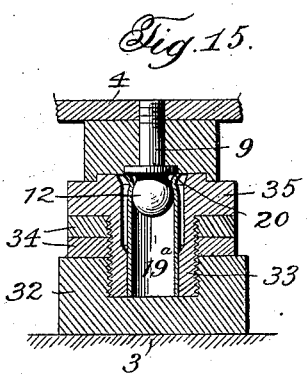
Figure 16:
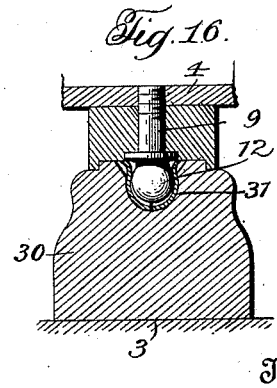

In the drawings: Figure 1 is a side elevation of an automobile with the emergency attachment applied to the rim of one of the front wheels, Fig. 2 is an enlarged view of the emergency attachment in position on a wheel, and a portion of the main wheel rim being cut away adjacent one of the centering blocks, Fig. 3 discloses one of the steps in the application of the device, Figs. 4, 5, and 6 are modified forms of emergency rims and treads adapted to be used in connection with the novel attaching device, Fig. 7 is a section of one form of attaching device, Fig. 8 is a section of another form of the same, as illustrated in Figs. 1, 2 and 3, Fig. 8$^a$ is a detail view of a modified form of interlocking connection between the adjusting device and that part of the attaching device carried by the emergency rim, Fig. 9 is a top plan view of the adjusting device and support applied to the main rim, Fig. 10 is a bottom plan of that part of the securing device carried by the emergency rim, Figs. 11 and 12 are detail views illustrating the engagement between the attaching device and the valve opening of the main wheel rim to prevent creeping of the device, Figs. 13 and 14 are detail views of another form of emergency rim and tread, and Figs. 15 and 16 are vertical sections of two forms of spacing or positioning guide blocks.

Referring now more particularly to the drawings wherein like reference numerals refer to corresponding parts throughout the several figures, 1 is a motor vehicle, 2 a wheel thereof having an ordinary channeled tire-carrying rim 3, and 3$^a$ an ordinary pneumatic tire removable as is usual, and adapted to be replaced by the improved emergency attachment about to be described. The attachment includes a rim 4 and a tread 5, the latter being constructed of any desired material, but preferably of a yielding character, such as a rubber cushion.

In Figs. 1, 2, 3, 4, 7, 8, 13, 14, 15 and 16 of the drawings the rim 4 takes the form of one piece, preferably of metal, and 5 in Figs. 1, 2, 3, 7 and 8 is a yieldable tread preferably of rubber.

Figure 4:
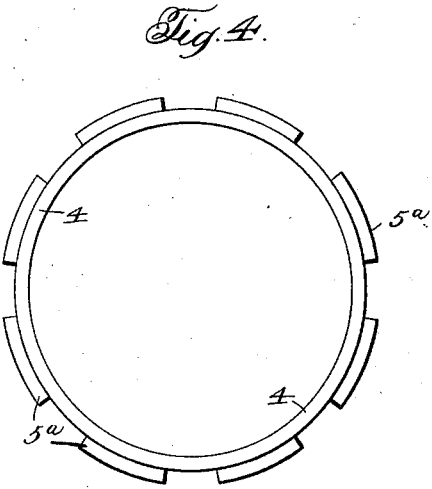

In Fig. 4 of the drawings a modified form of tread for the emergency attachment is shown, the same consisting of a plurality of blocks 5$^a$ of rubber or the like, which may be separated from one another as shown for the purpose of lightness and saving in cost, the blocks being secured in position on the rim in any desired manner.

In Fig. 5 another modified construction of spare rim and tread is shown, the same consisting of a plurality of rim sections 4$^a$ carrying cushion sections 5$^b$. The rim sections are removably secured one to the other as by bolts 6 passing through overlapping side flanges 6$^a$.

In Fig. 6 still another modified construction of spare rim and tread is illustrated, consisting of a plurality of rim sections 4$^b$ carrying cushion sections 5$^c$. In this form, the rim sections conveniently have at their ends downwardly projecting flanges 7$^a$, the flanges or adjoining sections being detachably connected as by adjustable bolts 7 having a head at one end and a threaded nut at the other.

In Figs. 13 and 14 of the drawings the tread member comprises a metallic member 8 which may take various forms, that shown for the purpose of illustration taking the form of a tube conveniently of lead pipe as shown.

While the above will serve to illustrate certain preferred forms of rim and tread, many others may be used to advantage in connection with the novel means of attachment about to be described.

Referring more particularly to Fig. 7, 9 is a supporting post threaded or otherwise secured at 9$^a$, to the rim 4 whereby it may be removed as desired. Sleeved upon the post 9 is a block or collar 10 of any desired construction but conveniently round and having a substantially flat upper surface for engaging the under surface of the rim 4. Adjacent the lower end of the post 9 is an annular collar 11$^b$ adapted to fit in the recess 11$^a$ in the under surface of the collar 10. The post 9, terminates at its lower end in an engaging knob or head 12.

In Figs. 1, 2, 3, 6 and 8 the supporting post 9 is threaded to an extended supporting block 10$^a$ which in turn is secured to the rim 4 by bolts or the like 10$^b$. The block 10$^a$ has an annular boss 10$^c$ which in this construction takes the place of the block or collar 10 in the construction previously described. An adjustable supporting member for either of the attaching mechanisms just described is provided, the same being adapted to engage the rim of the main wheel and preferably constructed as follows. The base block 13 of the supporting member conveniently takes the form of a square nut and is preferably constructed so that the diameter between its sides is slightly less than the distance between the upright flanges of the rim 3 whereby the same may be readily slipped into place without engaging said flanges. By a slight turn of the base 13 opposite corners of the same may contact with the side walls of the rim as illustrated in dotted lines in Fig. 9 and thereby hold the base in a substantially fixed position during the adjustment about to be described. The base part 13 has a threaded aperture 14 adapted for the reception of a bolt 15 having an engaging head 16 with straight edges for the application of a wrench or other adjusting tool. The collar 10 of Fig. 7 and boss 10$^c$ of Fig. 8 are adapted to rest upon the head 16 and various means may be provided to establish an interlocking connection for preventing relative movement. For instance, in Figs. 7 and 8 an annular boss 17 projects upwardly from the head 16 adapted to seat within a recess 18 formed by a peripheral flange 19 on the collar 10. In Fig. 8$^a$ the engagement is formed by providing the boss 17$^a$ on the collar 10$^c$ and a seat 18$^a$ on the member 15$^a$ which takes the place of the parts 15 and 16 of Fig. 7 for instance. Either form of interlocking engagement permits relative lateral movement between the parts. Fitted in a recess in the upper surface of the head 16 and secured thereto in any desired manner is a socket member 19$^a$ having a spring clasp or clasps 20 arranged to engage over the head 12 of the supporting stem and lock the parts against separation, while permitting ready engagement and disengagement by application of force.

The mode of operation and manner of application of the parts just described may be reviewed as follows:

Assuming that the tire has been punctured the injured tire is disengaged from its rim, and the emergency rim with the connected post or stem 9 and collars slipped thereover. The supporting members are now placed upon said rim at one side of the post 9 and afterward slid along the rim 3 until they assume positions directly below the posts 9 when the head 12 at the end of the stem 9 is forced into the spring socket of the nut 15. The parts of the attachment now being properly centered, the nut 15, may be raised until said nut frictionally contacts with the collar 10. The base 13 is preferably of a thickness approximately equal to the depth of the rim 3 whereby the upper surface of the head of the nut 15 will when lowered assume a position substantially flush or above the upper edge of the side flanges of the rim 3 within ready access of the adjusting tool. By the peculiar adjusting means above described it will be noted that the stems or posts 9 while preventing separation of the parts at the same time constitute a centering device or guide for the movable parts. By rotating the head of the nut 15 through the medium of a wrench or the like it will be appreciated that a powerful frictional hold is the result, determined by the number of revolutions of the nut 15. The frictional contact between the parts is sufficient to firmly hold the spare rim upon the rim 3 of the main wheel and any accidental slipping or play of the parts prevented. It will also be appreciated that the strain is directly upon the base portion of the main wheel rim, or in the channel between the side flanges thereof.

In the modified construction shown in Fig. 16 that portion of the attaching means carried by the spare rim, including the supporting post or stem 9, are the same as in the forms just described but in some instances the interengaging means or supporting part of the attachment adapted to engage the main rim 3 instead of being adjustable as above described may comprise blocks 30 of any desired construction adapted to rest upon the main wheel rim 3, and having a spring socket member 31 in its upper surface arranged to be engaged by the enlarged head 12 of the post or stem 9. By this arrangement, a number of the adjustable securing devices of the type above described may be eliminated with the incident saving, although it is within the contemplation of the invention to use one or more of said adjustable securing devices in connection with the form of devices illustrated in Fig. 16 and in this connection, the blocks 30 may be termed centering blocks or guides for properly positioning the spare rim and holding the same while the adjustable securing members are being applied. When the centering blocks 30 are employed, the spare rim is positioned upon the main rim 3, it being understood of course, that the injured tire has previously been removed, and one portion of the rim of the spare rim is raised relative to the main rim 3 for the ready insertion of the centering blocks 30. When in this position the spare rim is forced inwardly when the stems or posts 9 are engaged within the sockets 31 thereby properly positioning the spare rim for the insertion of the adjustable securing devices previously described.

From the description above it will be noted that the stationary centering blocks may extend practically half way around the rim and the adjustable securing devices the other half, the same being spaced as desired and any suitable number of each being employed.

Since the main wheels of the vehicle at times vary in size, and it is desirable to have a spare rim which is adapted for use with various sized wheels, the centering blocks might be adjustable and to this end the form of centering device illustrated in Fig. 15 may be used, the same including a base block 32 and an adjusting nut 33, or block 33 having the spring socket for the reception of the head of the post 9. Loosely mounted upon the base block 32 and sleeved upon the adjusting nut 33 are one or more washers 34 adapted to be contacted by the head 35 of the nut 33. It is observed that by the use of one or more washers 34 the position of the head 33 may be regulated and when once regulated will constitute in effect a solid block substantially similar to the centering block 30 above described.

It has been seen that the emergency attachment when applied will occupy practically the same position relatively to the main wheel as did the replaced tire with the result that the spare rim will be properly balanced and will be firmly supported by the wheel spokes and hub. Again, by reason of the peculiar adjustable securing devices a very powerful frictional holding engagement between the parts is provided which will prevent any serious creeping or slipping of the spare rim. To further provide against this, however, applicant takes advantage of the usual air tube opening 19' found in the rim of all wheels employing a pneumatic tire, and applied upon one of the base blocks 13 a depending lug 20' of any desired construction adapted to fit in said air tube opening of the main wheel. This structure will the more firmly support the emergency rim and prevent slipping.

The present emergency attachment is one which may be produced at a relatively small cost, the same may be quickly applied and is devoid of all lateral projections beyond the rim of the main wheel. Further, by reason of the fact that the attachment fits directly to the base of the main wheel rim, the rim, spokes or other parts of the main wheel will not be damaged by the application. When not in use the attaching devices may be stored away in a relatively small space, and if the rim and tread are made in sections as illustrated in Figs. 5 and 6 for instance all of the parts including the rim, tread and attaching devices when separated may be placed in the usual storage box until needed for use. Another important advantage in forming the spare rim in sections, such as disclosed in Fig. 6 for illustration resides in the fact that the sections 4$^b$ being adjustably connected together by the bolt 7, the section may be adjusted to accommodate the spare rim to main wheel rims of different sizes. This has an especial advantage when used in connection with the adjustable supports interposed between the spare rim and the main wheel rim, since after adjusting the sections of the spare rim to regulate the size thereof to the size of the replaced tire, the supports are adjusted to accommodate themselves to the spare rim, and the tread of the spare rim will be positioned in the same relation to the treads of the remaining wheels of the vehicle as the tread of the replaced tire. In other words the size of each of the wheels, including that one the tire of which has been replaced by my emergency attachment will be in effect the same. The spare wheel rim being thus constructed and arranged, it will be appreciated that the emergency attachment is applicable to wheels of different sizes, and will effectively take the place of and occupy the same relative position as did the replaced tire.

I claim:—

1. In an emergency attachment for vehicle wheels, a block to engage an auxiliary rim, and supporting means therefor including a block to engage the channel portion of the rim of the main wheel, and an auxiliary adjusting block interposed between the two first mentioned blocks and having a direct engagement with both of said blocks.

2. A spare rim adapted to be applied to a main wheel in combination with attaching devices comprising a block adapted to engage the rim of the main wheel, an auxiliary block adapted to engage the spare rim, an interposed adjusting device, and a centering stem projecting from one of said blocks.

3. A spare rim adapted to be applied to the rim of the main wheel, and interposed attaching devices comprising a supporting member to be applied to the main wheel rim, a member to be applied to the spare rim, an interlocking connection between the members preventing lateral separation and an auxiliary interlocking connection preventing longitudinal separation of said members.

4. A spare rim adapted to fit over the rim of a main wheel, and attaching means therefor, including a member adapted to be applied to the spare rim, a supporting member adapted to be applied to the main wheel and spring locking means between said members.

5. A spare rim adapted to be applied to the rim of a main wheel and attaching means therefor including a supporting member adapted to engage the rim of a main wheel, a member adapted to engage the spare rim, a headed pin projecting from one member and a yieldable socket carried by the other.

6. A spare rim adapted to be applied to the rim of a main wheel and attaching parts therefor including a supporting member adapted to engage the rim of a main wheel, a member adapted to engage the spare rim, a headed pin projecting from one member and a yieldable socket carried by the other, and one of said members being adjustable.

7. A spare rim adapted to be applied to the rim of a main wheel and attaching means therefor including a supporting member adapted to engage the rim of a main wheel, a member adapted to engage the spare rim, a headed pin projecting from one part, and a yieldable socket carried by the other, and a relatively solid guide or centering block adapted to be interposed between the two rims, at a point spaced from said attaching means.

8. In an emergency attachment for vehicle wheels, the combination of a spare rim adapted to engage over the main rim of a vehicle wheel, and supporting means interposed between the two rims including an adjustable supporting member adapted to engage the base of the main rim between the flanges thereof, said member having a substantially square base adapted to be turned to bring its corners into binding engagement with the flanges of the main rim.

9. A spare rim adapted to fit over the rim of a main wheel and means for attaching the spare rim including a supporting member interposed between the rims and a lug on said member adapted to engage the air tube opening of the main wheel rim.

10. A spare rim adapted to fit over a main wheel and take the place of the removed tire, attaching means for the spare rim including two superimposed members one of which is adjustable and is adapted to rest on the main wheel rim and locking means between the members.

11. As a means for attaching an emergency rim to a main wheel, an adjustable securing device adapted to engage respectively the main rim and the emergency rim to secure the latter in position, and a centering device adapted to be interposed between said rims for properly spacing the emergency rim around the periphery of the main wheel and holding the same properly positioned during the application of said securing device.

12. As a means for attaching a spare rim to a main wheel rim, a block adapted to frictionally contact with the surface of the base of one rim, a block adapted to be applied to the other rim, and a nut threaded to one of said parts and having an integral extended head frictionally engaging the other as and for the purpose described.

13. As a means for attaching a spare rim to a main rim, an adjustable securing device adapted to engage respectively the said rims to secure the spare rim in position and a centering device adapted to be interposed between said rims for properly spacing the spare rim around the periphery of the main wheel and holding the same properly positioned during the application of said securing device, said centering device including two parts having a coöperative pin and yieldable socket connection.

14. In an emergency attachment of the character described, the combination of a rim having a yieldable tread, and means to attach said parts to a main wheel rim having said flanges including a block of rigid construction to engage the channel portion of the main wheel rim and of a thickness to offer no obstruction beyond said flanges, a block of rigid construction to engage the base of the first mentioned rim, and a lengthwise adjustable connection therebetween.

15. In an emergency attachment of the character described, the combination of a rim, and means to attach said rim to the rim of a main wheel including a block to engage the base of the main rim, a block to engage the base of the first mentioned rim, and an auxiliary block threaded directly to one of said blocks and frictionally engaging directly against the other block.

16. In an emergency attachment of the character described, the combination of a rim, and means to attach said rim to the rim of a main wheel including a block to engage the base of the main wheel rim, a block to engage the base of the first mentioned rim, and an auxiliary part having a threaded connection with one of said blocks and an interlocking engagement with the other.

17. In an emergency attachment of the character described, the combination of an emergency rim adapted to be applied over the main wheel rim, means for supporting the same including a block to be applied to the emergency rim, an auxiliary block to engage the same, one block having a reduced portion and the other a coöperating projection constituting an interlocking connection, and an adjustable connection between the auxiliary block and the rim of the main wheel.

18. In an emergency attachment of the character described, the combination of an emergency rim adapted to be applied over the main wheel rim, a block to be applied to the emergency rim, an auxiliary block to engage the first mentioned block, one block having a reduced portion and the other an interlocking projection, an adjustable connection between the auxiliary block and the rim of the main wheel, and a centering pin projecting from one block and adapted to engage a recess in the other.

19. In an emergency attachment of the character described, the combination of an emergency rim adapted to be applied over the main wheel rim, a block to be applied to the emergency rim, an auxiliary block to engage the first mentioned block, one block having a reduced portion and the other an interlocking projection, and an adjustable connection between the auxiliary block and the rim of the main wheel including an integral threaded extension on the auxiliary block and a base block threaded to said extension.

20. In an emergency attachment for vehicle wheels, a spare rim of a size to fit over a main wheel rim, said spare rim being made up of a plurality of sections, means for adjustably connecting said sections together whereby the spare rim may be adjusted to fit rims of different sizes and whereby to position the tread of the spare rim in the same relation to the tread of the other wheels of the vehicle as the replaced tire, and means adapted to be interposed between the spare rim and the channel of the main wheel rim for supporting said spare rim upon the main rim of a tire, said means being adjustable whereby to accommodate itself to the adjustment of the spare rim, and the spare rim sections being detachable.

In testimony whereof I affix my signature in presence of two witnesses.

EDWARD T. BURROWES.

Witnesses:
WARREN W. COLE,
L. GROVES WEYMOUTH.

Copies of this patent may be obtained for five cents each, by addressing the "Commissioner of Patents, Washington, D. C."